United States Patent [19]
Zielke

[11] 3,848,825
[45] Nov. 19, 1974

[54] SEMI-AUTOMATIC CASSETTE LOADER

[75] Inventor: Darrell W. Zielke, Valencia, Calif.

[73] Assignee: Superscope, Inc., Sun Valley, Calif.

[22] Filed: May 21, 1973

[21] Appl. No.: 361,978

[52] U.S. Cl. .............................. 242/56 R, 156/502
[51] Int. Cl. .......................................... B65h 19/20
[58] Field of Search ............ 242/56 R, 76, 197, 200; 179/100.2 E; 156/502, 505, 506

[56] References Cited
UNITED STATES PATENTS

| | | | |
|---|---|---|---|
| 3,693,900 | 9/1972 | Bohn | 242/56 R |
| 3,737,358 | 6/1973 | King | 156/502 |
| 3,753,834 | 8/1973 | King | 156/506 |
| 3,770,551 | 11/1973 | Ceroll | 156/506 |

Primary Examiner—Leonard D. Christian
Attorney, Agent, or Firm—Fulwider, Patton, Rieber, Lee & Utecht

[57] ABSTRACT

A semi-automatic machine for loading magnetic tape into a cassette after the latter has been placed in the machine with the leader loop in place on the positioning means of the machine. The positioning means comprise relatively movable blocks with vacuum grooves for holding and positioning the leader loop and the magnetic tape during severing and splicing operations, which are accomplished by a reciprocating head that is converted alternately from a cutting condition to a splicing condition as an incident to its reciprocation into and out of engagement with the positioning blocks. The automatic portion of each cycle is controlled by a cam assembly and associated electrical and pneumatic circuitry.

29 Claims, 16 Drawing Figures

SEMI-AUTOMATIC CASSETTE LOADER

BACKGROUND OF THE INVENTION

This invention relates to the loading of strip material, such as magnetic tape, from a bulk supply into individual holders such as cassettes. More specifically, the invention relates to the transfer of preselected lengths of magnetic tape, which may be either recorded or unrecorded, from tape pancakes containing a relatively large number of cassette loads of tape, and into tape cassettes, of the type having two reels with which the tapes may be wound back and forth in the cassette.

In conventional practice, empty cassettes are supplied with leaders that are attached to the reels of the cassettes and wound into the cassettes to be pulled out as loops preparatory to the loading operation. After a loop has been pulled out, the leader is severed between its ends to form two leader strips, each connected to one of the reels. One of these strips is spliced to the free, leading end of the tape on the pancake, and the reel to which the tape is connected is rotated to wind the spliced leader strip and the tape onto the rotating reel as tape is fed off the pancake.

After the desired length of tape has been transferred to the rotating reel, as detected either by a footage counter, in the case of unrecorded tape, or by a signal detector, in the case of recorded tape, the tape is severed and the trailing end of the length of tape on the reel is spliced to the leader strip attached to the other reel. Then this leader strip is wound into the cassette to complete the loading operation.

The loading operation usually has been performed in the past as a basically manual operation, in which an operator draws out and severs the leader, makes the first splice, actuates drive motors to perform the loading operation, and then makes the second splice before winding in the second leader strip. Such manual loading, even by skilled operators using specially designed splicing and loading fixtures, has been relatively slow and, therefore, expensive.

Because of this, efforts have been made to develop automatic tape loaders with higher output capacities. Several such loaders have been produced, but are generally characterized by relatively low output capacities and relatively complex constructions resulting in relatively high costs.

SUMMARY OF THE INVENTION

The present invention resides in a tape loading machine that is capable of higher speed operation than has been practical with the loading machines and methods that have been available, and that is, at the same time, simpler in construction and capable of being manufactured at substantially lower cost than such prior machines.

To these ends, the machine has basically conventional components for supporting a cassette to be loaded and a pancake for supplying the tape to the cassette, as well as means for guiding and feeding tape tape along a predetermined path from the pancake to the cassette, and also has a positioning device for receiving the leader loop of a cassette in a quick and simple manner preparatory to loading. The ends of the leader strips and the magnetic tape are held and positioned by this device during severing and splicing operations, and the machine also includes a novel cutting-and-splicing mechanism which cooperates with the positioning device to perform alternating cutting and splicing operations in a rapid and simple manner. The result is a relatively simple and inexpensive loader that can be set up for automatic operation in a manner requiring a minimum of manipulation of the leader and the tape, and which rapidly and automatically performs the various operations required for loading a cassette after the leader is in place on the positioning device.

More specifically, and as illustrated herein as the preferred embodiment of the invention, the positioning device comprises two side-by-side holding members disposed on one side of the path of the tape and relatively movable back and forth between two different conditions, to receive the leader and the leading end of the tape in one condition, to displace the two leader strips from each other after severance of the loop, while aligning the leading end of the tape with one strip for splicing, and then to align the trailing end of the tape with the other strip for splicing after severance of the tape from the supply roll. Vacuum holding means are provided on the holding members for receiving the leader loop of a cassette as an incident to a simple and rapid withdrawal motion, and to position both the leader strips and the tape ends relative to each other for the splicing operations.

The cutting-and-splicing mechanism is repetitively engageable with the holding members and is alternately operable as a cutter and as a splicer, first to sever the leader loop, and then to splice the leading end of the tape to one leader strip after displacement of the strips and preparatory to winding of the tape onto the cassette reel. The mechanism then severs the tape from the supply roll, and finally splices the trailing end of the tape to the other leader strip after displacement of the latter back into alignment with the tape. The preferred cutting-and-splicing mechanism comprises a simple reciprocating head, with means converting it alternately from a cutter to a splicer as an incident to its reciprocation, and also including means for supplying a strip of splicing material during each splicing operation. The head cooperates with the positioning device in trapping and holding the material being severed, and in this manner simplifies the operation and makes it possible to use a single cutter blade almost indefinitely.

Suitable controls are provided for producing a fully automatic cycle after the leader loop from a cassette has been placed on the positioning means, preferably including the winding of the leader back into the cassette as a final step. The preferred main control element is a cam shaft carrying a plurality of cams for timing the various operations in the cycle, during a selected angular increment of rotation of the cam shaft, herein one revolution.

Other aspects and advantages of the invention will become apparent from the following detailed description, taken in conjunction with the accompanying drawings.

a third holding groove formed in said first member parallel toaid first groove and offset from said path in said first condition and aligned with said path in said second condition, for holding the tape from the supply roll and movi g the same into alingment with said second groove;

means for receiving the second side portion of said loop as said first side portion is placed in said first and second grooves, and holding the second side portion in spaced relation with the first side portion;

a cutting-and-splicing head supported at said plicing station for reciprocation through forward and return strokes, toward and away from said path from the side thereof opposite said positioning means, into and out of engagement with the latter at said plane;

DETAILED DESCRIPTION

Figures 1, 2:
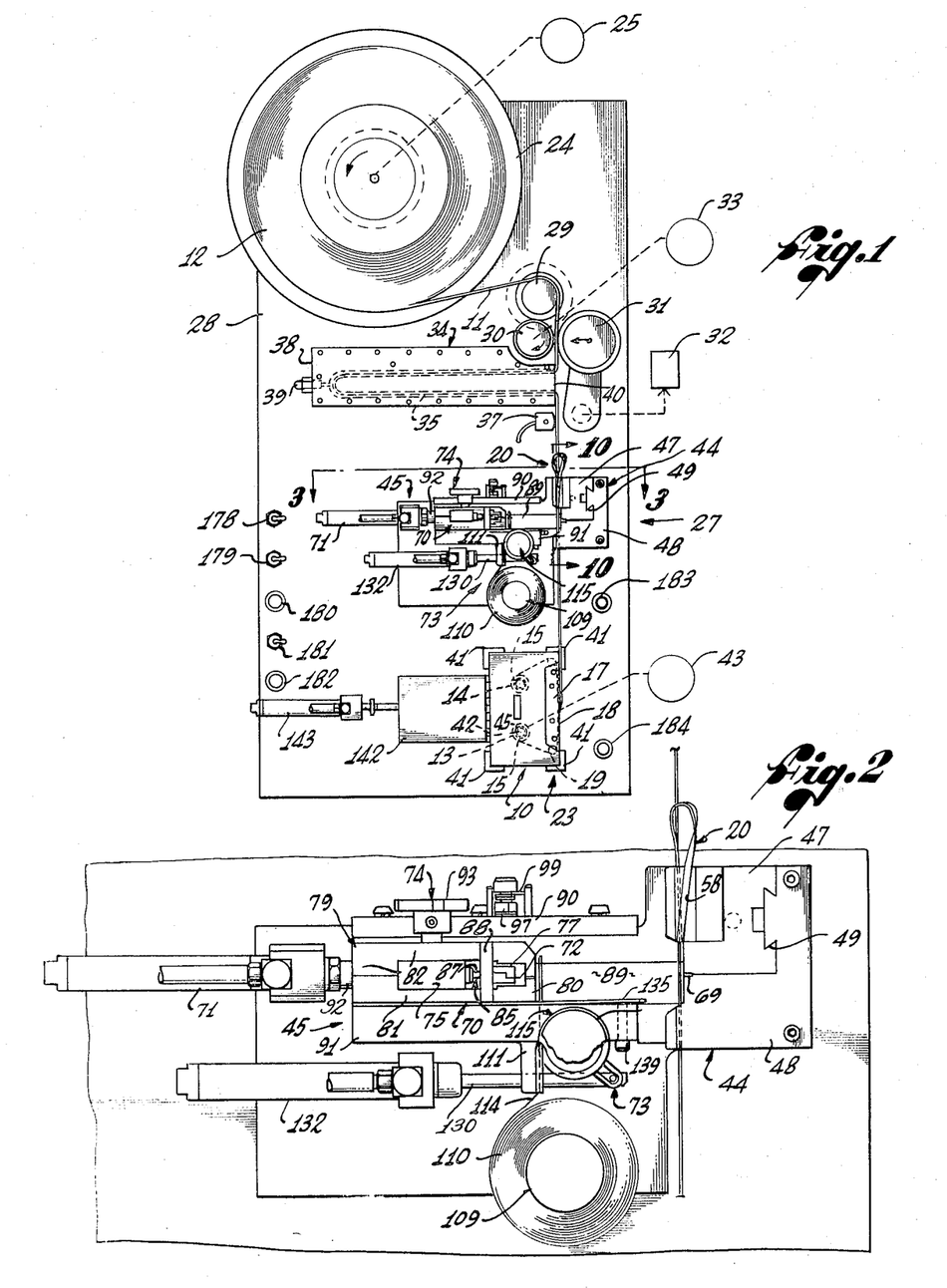
FIG. 1 is a plan view of a cassette loading machine embodying the novel features of the present invention, shown with a tape pancake and a cassette in place and with the leader of the cassette placed on the positioning device preparatory to the beginning of the loading cycle of the machine.
FIG. 2 is an enlarged fragmentary plan view similar to part of FIG. 1, with part of the splicing-material supplying means broken away and shown in cross-section.

As shown in the drawings for purposes of illustration, the invention is embodied in a machine for loading conventional tape cassettes, such as the representative cassette 10 shown in FIG. 1, with magnetic tape 11 from a bulk supply roll 12, or tape pancake, containing enough tape to load a large number of such cassettes. The pancake may contain a series of recorded programs to be sold on the cassettes, or may be simply a roll of unrecorded tape.

The cassette 10 comprises a flat, box-like case in which two reels 13 and 14, shown in broken lines in FIG. 1, are supported in side-by-side relation to rotate about parallel axes. Openings 15 in both sides of the case permit the insertion of drive spindles into the reels for engagement with internal drive abutments on the reels, herein shown as small pins projecting radially inwardly from the walls of center holes in the reels, and one edge portion of the cassette, herein the right-hand edge portion in FIG. 1, is slightly thickened as indicated at 17, and the right-hand edge 18 is formed with a plurality of apertures providing access to the tape.

Such cassettes are purchased empty, in large quantities, by those in the business of loading and selling the cassettes, and are supplied by the manufacturers with strips of leader material for attaching the magnetic tape to the reels during the loading of the cassettes. Each cassette initially has one strip 19 of leader material that is attached at its ends to the two reels 13 and 14 and is wound onto one of the reels, with one end portion extending along the inside of the apertured side edge 18 to the other reel. This strip thus can be drawn out of the cassette as a loop 20, and severed between its ends to form two leader strips 21 and 22, each attached to one of the reels and adapted to be joined to the opposite ends of the magnetic tape 11 that is to be loaded into the cassette.

After the free leading end of the magnetic tape 11 on the pancake 12 is spliced to one of the leader strips, herein the strip 21, tape is fed off the supply roll while the reel 13, to which the strip 21 is attached, is driven to wind the strip and a selected length of magnetic tape onto the reel. Then the tape is severed, the trailing or tail end of the length of tape on the reel is spliced to the other leader strip 22, and the tail end portion and the strip 22 are wound into the cassette.

Cassettes are loaded with varying lengths of magnetic tape, depending upon the playing or recording time desired. These typically include playing times of 30, 60, 90 and 120 minutes, with footages of tape that vary accordingly. For example, the footage of a 60-minute tape is about 281 feet.

A typical tape pancake 12 will contain about 21 60-minute loads, or about 42 32-minute loads. If unrecorded tape is being loaded, it is customary to control the length loaded into each cassette with a counter which measures the tape as it is wound into the cassette. If recorded tape is being loaded, signals are recorded on the tape between programs, and a sensor is provided to detect the signal and terminate the winding operation.

In general, the illustrative tape loader of this invention is of a semi-automatic type in which successive cassettes 10 to be loaded are placed manually in a suitable fixtures 23 such as an open-topped recess defining a loading station, and the pancake 12 is supported on a rotary platform 24 forming a supply station and driven by a motor 25 (see FIG. 16), the primary purpose of which is to feed tape off the roll while applying hold-back tension to the tape. The tape 11 is guided along a predetermined path from the supply roll, extending from the supply station through a cutting-and-splicing station indicated generally at 27, and then to the loading station.

In this instance, the three stations are spaced apart on the top of a flat table 28, the cutting-and-splicing station being centrally located between the supply and loading stations. After leaving the pancake 12, the tape 11 passes around an idler 29 and between a capstan 30 and a pinch roller 31, the latter being movable selectively by a solenoid actuator 32 into and out of engagement with the capstan, which is driven clockwise by a motor 33 to draw tape from the pancake around the idler and feed the tape toward the cutting-and-splicing station 27. A vacuum-chamber device 34 is positioned alongside the path of the tape to draw in a loop 35 when there is slack in the tape, and a sensor 37 (footage counter or signal sensor) is positioned between the vacuum-chamber device and the cutting-and-splicing station.

As shown in FIG. 1, the vacuum chamber device 34 is simply a flat and hollow enclosure, open at one end (the right end in FIG. 1), and defining an elongated internal chamber having a height slightly greater than the width of the magnetic tape. Vacuum is applied to the chamber adjacent its closed end 38, herein through a fitting 39, and thus creates an air flow into the chamber through its open end 40 sufficient to pull the tape into the chamber as shown in FIG. 1 when the tape is slack.

The fixture 23 defining the loading station comprises four right-angle brackets 41 for fitting relatively loosely around the corners of the cassette to be loaded, as shown in FIG. 1. A spindle 42 projects upwardly into the recess defined by the corner brackets, and is positioned therein to fit into the reel 13 as the cassette 10 is placed in the fixture. This spindle is coupled to a high-speed motor 43 which, when activated, rotates the spindle to wind magnetic tape 11 onto the reel 13.

It is to be understood that fixtures and machines having the foregoing general characteristics, components and functions have been used in the past for manual and semi-automatic loading, since the basic loading sequence performed is substantially the same in all such fixtures and machines. With prior manual-loading fixtures, the cutting and splicing operations have been performed manually, and the winding operation has been accomplished while the operator prepares another fixture for the winding operation.

Of course, the time available for attending to another fixture depends upon the length of the winding time in each machine, and thus upon both winding speed and the length being wound. Given approximately equal winding speeds, the output that can be achieved by one operator is determined by the amount of time required for the preparatory operations, including the cutting and splicing operations.

A skilled operator using two fixtures has had a production capability of perhaps 400 cassettes per shift. It is understood that presently available semi-automatic machines may increase this by about four times, but with a relatively high investment in the machinery.

In accordance with the present invention, the cassette loader has a novel combination of elements for performing the preparatory operations and the cutting and splicing operations more rapidly than has been practically possible with prior fixtures and machines, thereby enabling a single operator to achieve a substantially higher production capacity than has previously been achieved. Moreover, the loader is relatively simple in construction, as compared to prior semi-automatic machines, and thus can be manufactured at a relatively low cost.

To the foregoing ends, the cassette loader has positioning means, indicated generally at 44, onto which the leader loop 20 from the cassette 10 can be placed, in an initial condition of the positioning means, with a very rapid motion that is little more than the withdrawing motion required to pull the loop from the cassette. The positioning means first hold the loop for severance, then shift to displace the two severed strips 21 and 22 from each other for the first splicing operation, and also hold the free leading end of the magnetic tape 11, aligning this end with one of the appropriate leader strip as an incident to the displacement of the two strips, and also aligning the tail end of the tape with the other strip as an an incident to the eventual shifting of the positioning means back to the initial condition after the winding operation.

Combined with the positioning means 44 is a cutting-and-splicing mechanism 45 which is movable into and out of operative relation with the positioning means, and is alternately operable during successive strokes as a cutting mechanism and as a splicing mechanism. Through sequential controls, the entire operation after initial placement of the loop is performed at high speed, and comprises (1) an initial cutting stroke; (2) displacement of the severed leader strips 21 and 22 and a splicing stroke during which one leader strip 21 is spliced to the tape 11; (3) winding; (4) a second cutting stroke; (5) displacement of the severed tape ends and a second splicing stroke during which the tail end of the tape is spliced to the other leader strip 22; and (6) wind-in of the tail end portion and the leader strip attached thereto.

Figures 9, 10, 11:
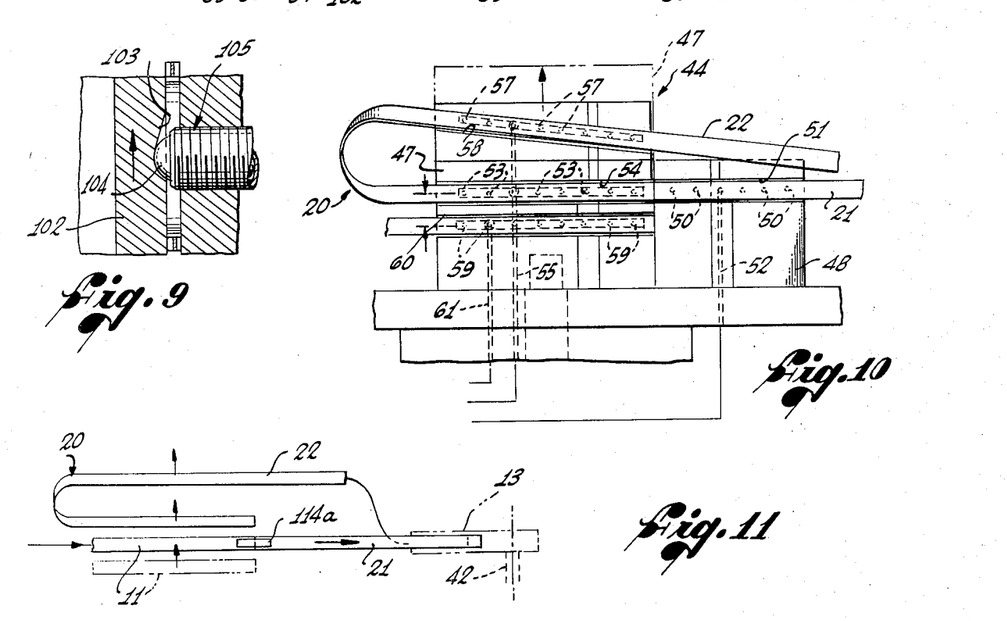
FIG. 9 is an enlarged fragmentary cross-sectional view taken substantially along line 9—9 of FIG. 7.
FIG. 10 is an enlarged fragmentary view taken along line 10—10 of FIG. 1, with the leader loop shown in the initial condition preparatory to initiation of a machine cycle.
FIG. 11 is a schematic view illustrating the displacement of the leader strips from the initial condition and the splicing of one strip to the leading end of the magnetic tape.

More specifically, the positioning means 44 comprise two holding members 47 and 48 disposed in side-by-side relation on one side of the tape path, the right-hand side in FIGS. 1 and 2, and supported for relative displacing movement transversely of the path, vertically as illustrated in FIG. 10. Herein, these members are two blocks having upright holding faces on the sides adjacent the tape path, one block being L-shaped as shown in FIG. 1 and the other being nested in the first and slidably coupled thereto by a dovetail connection 49 permitting the block 47 to slide up and down between lowered and raised positions.

The L-shaped block 48 has a series of vacuum holes 50 (see FIG. 10) in its holding face arranged in a row that extends along the tape path in a locating groove 51 slightly wider than the tape, so that vacuum can be applied to these holes to hold a leader strip or an end portion of the tape releasably in the locating groove 51. Vacuum is applied selectively, in a manner to be described, through a conduit 52 communicating with all of the holes 50, to grip the leader loop 20 when it first is placed in the groove, release it during winding, grip the tail end portion of the tape 11 for the second splice, and release it during the wind-in of the tail.

The holding face of the movable block 47 has a similar series of vacuum holes 53, also in a positioning grove 54, extending along the tape path as a continuation of the first series of holes 50 when the positioning blocks are in their initial condition, that is, when the movable block 47 is lowered. Vacuum is selectively applied to these holes 53 through a conduit 55 (FIG. 10), to hold the leader loop in the groove 54. Above this groove, the holding face of the block 47 is inclined upwardly and to the right, away from the path of the tape 11, as shown most clearly in FIGS. 2 and 3, and a third row of vacuum holes 57 is provided in a third positioning groove 58 that is inclined across the inclined face of the block, as shown most clearly in FIG. 10.

Vacuum is applied to the holes 57 in the groove 58 through the conduit 55, along with the holes 53, to hold the leader loop 20 in the initial position shown in FIG. 10. The inclines applied to the groove 58 and to the surface in which it is formed are selected so that the groove 58 receives the upper portion of the loop and holds it separated from the lower portion, permitting the loop to be drawn out of the cassette and laid into the grooves 51, 54 and 58 with a drawing motion and a slight twist, that can be a single continuous motion after the operator has acquired a little experience. Although the angles are not critical, a suitable angle of incline of the face is on the order of 20° to 30° from vertical, and the incline of the groove 58 may be on the order of 10° to 15° from horizontal.

Formed in the positioning face of the movable block 47 is another row of vacuum holes 59, which extend along another locating groove 60 spaced from the groove 54 in which the lower portion of the leader loop 20 is laid, this groove being shown as below the intermediate groove 54 and the holes 59 being connected to a vacuum conduit 61. This lower groove receives the leading end portion of the tape 11 from the supply roll 12, and is movable into and out of alignment with the groove 51 in the stationary block 48, as the block 47 is raised and lowered.

Shifting of the movable block 47 between two different positions relative to the fixed block 48 is accomplished by an air cylinder 62 (see FIG. 3) that is slung on the underside of the table 28 in a cup-like housing 63, and has a piston rod 64 which extends upwardly to the movable block. A coiled return spring 65 is fitted around the rod and compressed between the table and a cup 67 carried by the rod, and air under pressure is selectively delivered to the cylinder through a line 68. When air is supplied to the cylinder, the rod 64 is extended to raise the block 47, the raised position being determined by engagement of the cup 67 with the underside of the table. When the actuating air pressure is relieved, the spring 65 returns the piston rod to the lowered position shown in FIG. 3.

Thus, after a leader loop 20 has been placed in the grooves 51, 54 and 58, it can be severed between the two blocks, and the movable block can be raised to displace the ends of the leader strips (see FIG. 11) while raising the leading end of the tape 11 in the groove 60 into alignment with the leader strip in the groove 51. The two blocks are close together so that the ends of the tape and the strip are close together for splicing when aligned. As shown in FIG. 2, the blocks may be in sliding contact with each other, with a vertically elongated notch 69 in the block 48 forming a recess for receiving the cutting tool. After a length of tape has been wound into the cassette 10 and the tape has been severed between the blocks, the block 47 is lowered back to the initial position. This aligns the leader strip in the groove 54 with the tail end in the groove 51, for the second splice.

The cutting-and-splicing mechanism 45 herein comprises a reciprocating head 70 mounted on top of the table 28 on the side of the tape path opposite the positioning blocks 47 and 48, and movable through forward and return strokes, toward and away from the blocks, by a pneumatic cut/splice cylinder 71. On the front side of the head, facing toward the blocks, is a cutting blade 72 that is aligned with the notch 69 and is movable relative to the head from a retracted position to an extended position for the cutting strokes of the head. Mounted alongside the head is a splice feeder 73 for supplying splicing material to the head for application to the tape and the leader strips on the positioning blocks for the splicing strokes of the head.

Also associated with the head 70 is a ratchet mechanism 74 which alternately permits the blade 72 to extend and holds it retracted during successive forward strokes of the head, to produce the alternating cutting and splicing strokes thereof, and means are provided for actuating the splice feeder 73 in timed relation with the reciprocation of the head to supply the splicing material during the splicing strokes. Thus, the ratchet mechanism and the splice feeder cooperate during alternating strokes of the head assembly to condition the assembly for the performance of the alternating operations.

As shown most clearly in FIGS. 2 through 8, the head 70 has two primary components—a hollow, block-like inner body 75 having a blade chuck 77 on its front side and a stem 78 projecting rearwardly from its rear side for connection to the actuating cylinder 71, and a generally rectangular outer body 79 having a central opening 80 within which the inner body is disposed with a loose sliding fit. The outer body has open upper and lower sides, a rear wall through which the stem 78 extends, and a front wall 80 extending across the blade chuck 77 and having a vertical slot within which a blade 72 is supported by the chuck.

Figure 7:
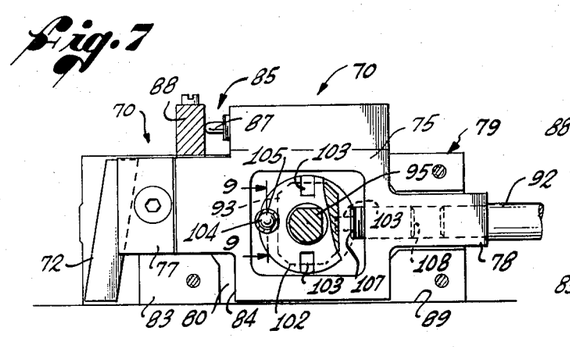
FIG. 7 is a fragmentary side elevational view of the reciprocating head, with one sidewall removed and parts broken away and shown in cross-section.
Figure 8:
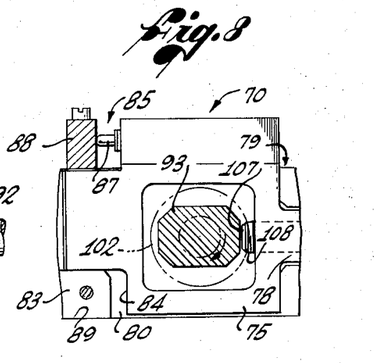
FIG. 8 is an enlarged fragmentary view similar to part of FIG. 7, with additional parts broken away and with parts in moved positions.

The front and rear walls of the outer body 79 are connected by two sidewalls 81 and 82, and a cross-bar 83 extending between the sidewalls underlies the blade chuck, and normally is spaced forwardly from the front 84 of the inner body, as shown in FIGS. 7 and 8. To hold the inner body yieldably in this position, a spring plunger assembly 85 is mounted in the upper portion of the inner body 75, and has a spring-loaded plunger 87 which engages a cross-bar 88 extending across the sidewalls 81 and 82 in front of the plunger assembly. This assembly may be of the well-known type sold under the trademark "Vlier."

In this condition of the two head bodies 75 and 79, the blade 72 is held by the chuck 77 with its forward cutting edge retracted within the slot in the front of the head. To extend the blade, which may be a simple razor blade, the inner body 75 is moved forward within the outer body 79 as permitted by the gap between the front wall 84 and the cross-bar 83, and by the yielding of the plunger 87.

The head 70 is slidable along a transverse slideway 89 on top of the table 28 between two parallel guide rails 90 and 91. Ball bearing assemblies 90$^a$ and 91$^a$ (see FIGS. 4 and 6) support the head on the rails for free back-and-forth movement. The cylinder 71 is mounted on the table top and has a piston rod 92 which is connected to the rear end of the stem 78, as viewed in FIG. 2, to slide the head back and forth along the slideway 89 as the the piston rod is extended and retracted. As the front wall of the outer body 79 is pressed forcibly against the positioning blocks 47 and 48 at the end of a forward, cutting stroke, the inner body 75 is shifted forward within the outer body to extend the blade through the front wall and into the notch 69 between the positioning blocks. Thus, a piece of tape or leader lying across the notch will be severed by the blade. Then, as the head is shifted away from the blocks, the inner body is shifted rearwardly within the outer body to retract the blade, and the head is returned with the blade in the retracted condition.

To prevent blade-extending movement of the inner body 75 relative to the outer body 79 during the splicing strokes, a blocking cam 93 (FIGS. 7 and 8) is mounted on the outer body, and disposed inside the inner body, and turned alternately between blocking and unblocking positions by the ratchet assembly 74. This assembly includes a ratchet wheel 94 (see FIGS. 2 through 5) that is rotatably supported on one sidewall 82 of the outer body on a shaft 95 which projects laterally across the top of guide rail 90 and supports the wheel for movement back and forth along the side of the guide rail remote from the head. Mounted on this side of the rail, in the path followed by depending teeth of the wheel during strokes of the head, is a pawl 97 which is pivoted on a pin 98 below the path of the wheel, the pawl being spring-urged to an upright position (shown in full lines in FIG. 3) by a torsion spring 99 that is coiled around the pivot pin 98 and stressed between the pawl and an anchor pin 100 on the rail 90 in front of the pivot pin. A stop pin 101 behind the pawl forms a limiting abutment against which the pawl is normally held by the spring 99, in the upright position.

Figures 3, 4, 5, 6:
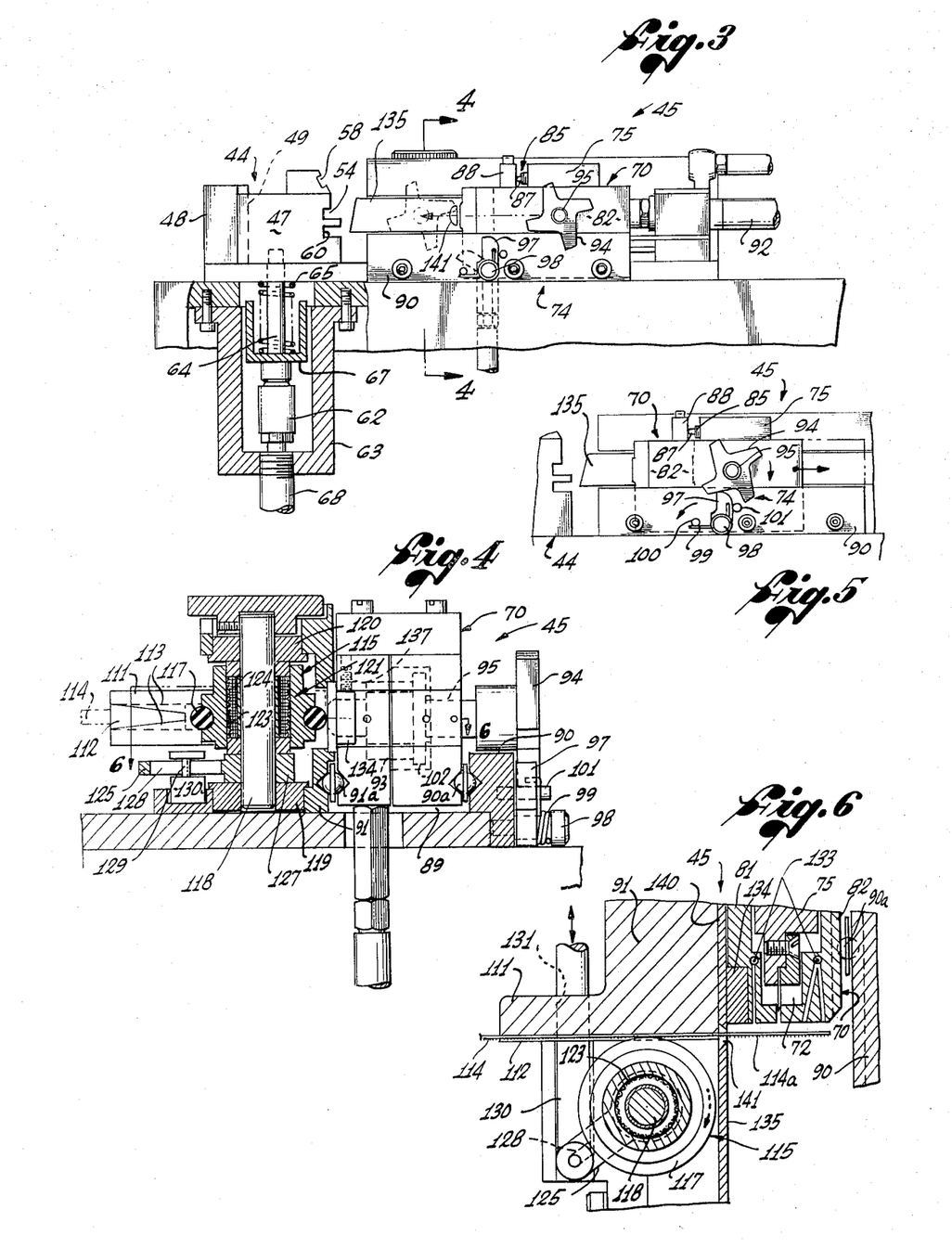
FIG. 3 is an enlarged fragmentary cross-sectional view takn substnatially along line 3—3 of FIG. 1.
FIG. 4 is an enlarged fragmentary cross-sectional view taken substantially along line 4—4 of FIG. 3.
FIG. 5 is a fragmentary elevational view of part of FIG. 3 with parts in moved positions.
FIG. 6 is an enlarged fragmentary cross-sectional view taken along line 6—6 of FIG. 4.

The ratchet wheel 94 has four teeth, the lower one of which engages the pawl 97 during each stroke of the head 70. During each forward stroke, the pawl yields forwardly to permit the wheel to pass without turning, as shown in broken lines in FIG. 3. During each return troke, the pawl is held in the upright position by the abutment pin 101, and thus blocks passage of the lower tooth of the wheel. Accordingly, the wheel is turned 90° in passing the pawl, as shown in FIG. 5, into a new angular position.

To locate and hold the ratchet wheel 94 releasably in each of the different angular positions, a detent disk 102 (FIGS. 4, 7 and 9) is coaxially mounted on the shaft 95 inside the head, along one sidewall 82 of the outer body 79, and is formed with four angularly spaced detent recesses 103 for receiving a spring-loaded ball detent 104. The ball detent is carried by the outer body, on the inner end of a spring-plunger assembly 105 (see FIG. 9) which also may be of the "Vlier" type, and is urged toward the disk to seat in the detent recesses. The latter may be simply short, generally radial grooves, as shown in FIG. 7, with arcuate bottom walls as shown in FIG. 9.

As the wheel 94 is turned to each new position, the ball detent 104 is cammed out of one detent recess 103, rides along the face of the disk 102, and then snaps into the next recess, seating against the curved bottom thereof to locate the disk until it is again positively turned to a new position. Of course, the detenting force exerted on the disk 102 by the ball detent is sufficient to insure against turning of the ratchet wheel 94 as it passes the pawl 97 during each forward stroke of the head 70.

The cam 93 is mounted inside the inner body 75 on the inner end portion of the shaft 95 beyond the detent disk 102, and is in the form of an elongated block of generally rectangular cross-section, longitudinally of the path of the head, and rotates with the shaft and the ratchet wheel 94. When the longitudinal axis of this cam is vertical, as shown in FIG. 7, the rear side of the cam is spaced forwardly from a stop abutment 107 on the inner side of the rear wall of the outer body 79 and thus permits the relative movement of the two bodies necessary for the blade to be extended to the cutting position. when the longitudinal axis of the cam is horizontal, however, as shown in FIG. 8, the rear or right-hand end of the cam is closer to the stop abutment, and thus cooperates with the abutment in preventing any appreciable forward motion of the inner body within the outer body.

In this instance, the stop abutment 107 is the end of a plug 108 threaded into the inner end of the passage through the stem 78 on the inner body 75. The stop thus is adjustable into the proper position, to permit the cam to turn freely into and out of the blocking position. The corners of the cam preferably are beveled for clearance purposes.

Accordingly, when the head 70 engages the positioning blocks 47 and 48 while the cam 93 is in the horizontal position, the cam blocks the blade-extending movement of the inner body, thus maintaining the blade 72 in the retracted position. Then, as the head is shifted back through the return stroke, the ratchet wheel 94 is turned 90° by the pawl 97, turning the cam to the vertical position, to prepare for extension of the blade during the next forward stroke. In this way, the head is conditioned for alternating cutting and splicing strokes automatically as an incident to its reciprocation.

The splice feeder 73 is mounted alongside the guide rail 91, and is operable to apply a strip of splicing material to the front of the head as the head begins each splicing stroke, the splicing strip being positioned on the head for aligned engagement with the tape and the leader strip to be spliced. As shown in FIGS. 1 and 2, the feeder includes a spindle 109 for holding a supply roll 110 of splicing material on top of the table 28, and a splice guide 111 which has a groove 112 (FIGS. 2, 4 and 6) in its front side extending across the forward end of the guide rail 91 and terminating alongside the path of the head, in front of the retracted position thereof (see FIG. 6). The groove preferably is lined with low-friction material, such as that sold under the trademark "Teflon," and preferably has overhanging lips 113 (FIG. 4) over the entry end portion of the groove 112, to retain the splicing material slidably in the groove.

To advance splicing material 114 from the supply roll 110 through the guide groove 112, a feed roller 115 is mounted in front of the groove 112 with a resilient ring 117 encircling its periphery and pressed against the bottom of the groove, in frictional engagement with the strip of splicing material therein. This feed roller is rotated intermittently through a selected, short angular increment, in timed relation with the reciprocation of the head, to feed selected lengths of splicing material along the groove 112 and into a cut-off position in front of the head.

More specifically, the feed roller 115 comprises a tubular sleeve (FIG. 4) that is supported on an upright shaft 118 between vertically spaced bearings 119 and 120 rotatably supporting the shaft, and a one-way clutch 121 is interposed between the shaft and the sleeve to turn the sleeve with the shaft in one direction of rotation of the latter, clockwise as viewed in FIGS. 1 and 2. The clutch may be of various types, a preferred type comprising a screen liner 123 secured to the inside of the sleeve, and a sleeve 124 of inclined fibers secured to the shaft, to lock in the screen in one direction and slip along the screen in the other.

Secured to the shaft 118 below the clutch 121 is a radial crank 125 (FIGS. 4 and 6) which has a hub ring 127 that is telescoped over and secured to the shaft. The crank also has a longitudinal slot 128 therein which slidably receives a coupling pin 129 projecting upwardly from an actuating rod 130, the rod being lidably guided in a hole 131 through the splice guide 111, and being movable endwise back and forth (front to rear) by a pneumatic cylinder 132 that is mounted on the table behind the splice guide.

As the actuating rod 130 is retracted by the cylinder 132, to the left FIGS. 1 and 2, the crank 125 is rotated clockwise to turn the shaft 118 and, through the clutch 121, the feed roller 115, through the selected angular increment. The peripheral ring 117, which preferably is composed of silicone material, feeds the splicing material 114 through the groove 112 and extends a selected length 114$^a$ of the material into the path of the head, as shown in FIG. 6. Then, as the rod 130 is extended to rock the crank back to the position shown in FIGS. 1 and 2, the clutch 121 slips so that the feed roller is allowed to remain stationary.

The extended length 114$^a$ of splicing material is gripped on the front of the head 70, herein by suction applied through a plurality of vacuum passages 133 (FIG. 6) opening forward through the front of the head in alignment with the splicing material, which thus is drawn almost immediately against the head. As the head begins its forward stroke, the projecting strip is sheared off by a cutter 134 (FIGS. 4 and 6) on the head, in cooperation with a backing element 135 supported beside the path of the cutter.

Herein, the cutter 134 is simply a block of suitable cutting material, such as carbide, and is fitted in a notch in the side of the head 70 adjacent the guide rail 91, to form the front corner of the head, in the area that is aligned vertically with the projecting strip 114$^a$ of splicing material. A set screw 137 (FIG. 4) holds the cutter in the notch. The backing element 135 which cooperates with the cutter in severing the splicing material is an elongated plate which is mounted along one side of the path of the head, for sliding engagement with the carbide block beyond the projecting strip of splicing material, which thus is sheared between the cutter and the adjacent end portion of the plate.

Preferably, the backing plate 135 is inclined slightly into the path of the cutter, and held yieldably in the inclined position by another spring plunger assembly 139 (see FIG. 2) to insure firm shearing engagement with the cutter. When the head is retracted, the cutter lies against the opposite end portion 140 (FIG. 6) of the plate 135, a gap 141 being formed in the plate to admit splicing material through the plate.

Also shown in FIG. 1 as an optional feature is a stamping device 142 for applying a code number to each cassette 10 as an incident to the loading operation. This device is actuated by a pneumatic cylinder 143 at an appropriate time during each cycle.

Figure 14:
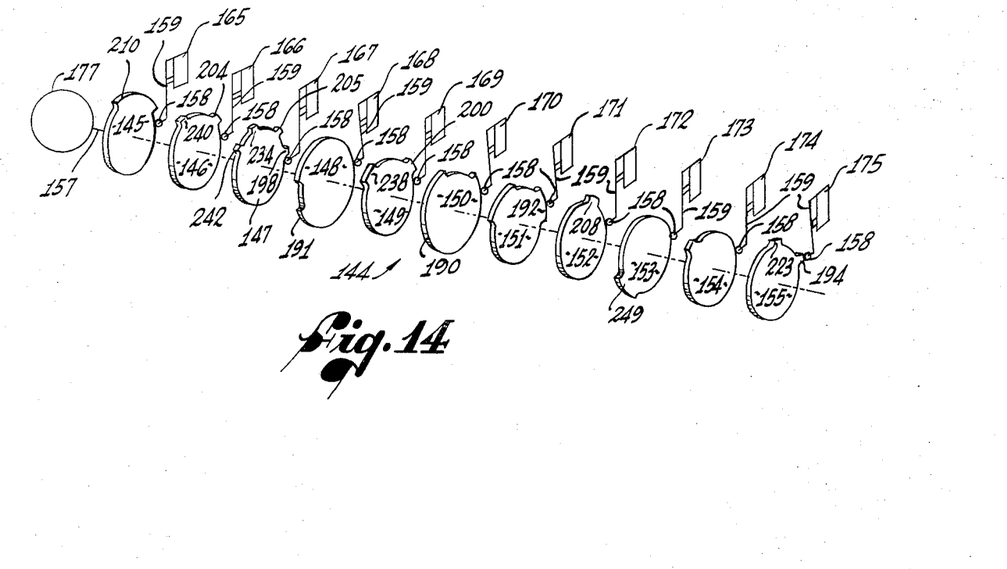
FIG. 14 is a schematic perspective view of parts of the illustrative control system of the machine.

Control of the automatic portion of the sequence of operations in loading a assette 10 with magnetic tape 11 may be accomplished in various ways, the preferred control means including a cam assembly 144, shown schematically in FIG. 14, and preferably mounted beneath the table 28. The cam assembly comprises a plurality of disklike cams 145 through 155, which are coaxially mounted on a single shaft 157 for rotation in unison by the shaft, relative to a plurality of followers 158 which are movably supported alongside the cams on levers 159 of a plurality of actuators 165 through 175, one for each cam.

The cam shaft 157 is drivingly coupled through reduction gearing (not shown) to a selectively operable motor 177, to be rotated through a full revolution to produce a full automatic cycle of the machine. In general, the first cam 165 controls the raising and lowering of the positioning block 47; cam 146 controls the splice feeder 73; cam 147 controls the reciprocation of the head 70; cams 148, 149, 150 and 151 control the application of vacuum to the positioning blocks and the head; cam 152 initiates operation of the winding motor 43 after the tape has been spliced; cam 153 initiates the leader pull-in after the final splice; cam 154 controls the stamp cylinder 143; and cam 155 controls the cam motor 177, stopping it during the tape-winding operation and again when the full sequence has been completed. In view of the foregoing, actuators 165 through 171 and 174 are air valves, while actuators 172, 173 and 175 are electrical switches, as will become more apparent in the following summary of operation and electrical circuitry.

Figure 16:
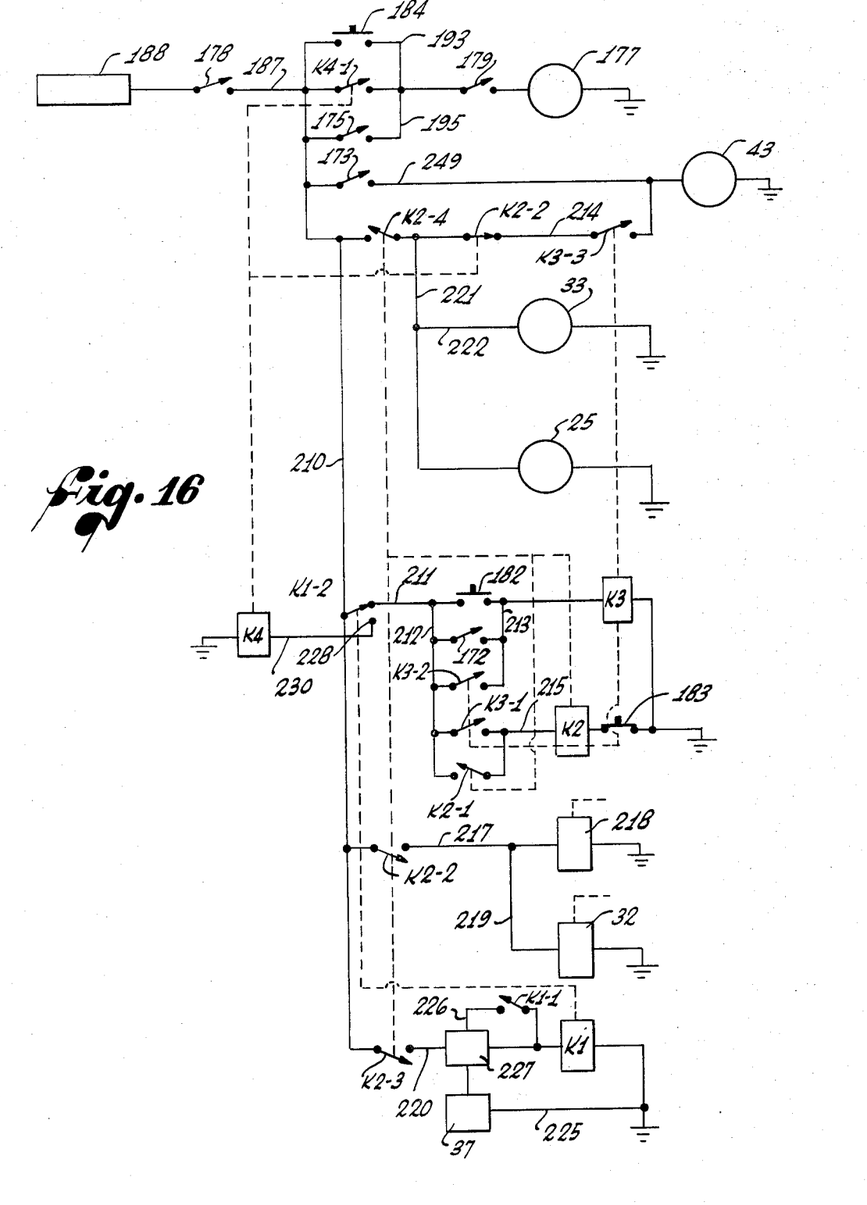
FIG. 16 is a simplified schematic circuit diagram of the electrical portion of the control system.

Also included in the illustrative control system is suitable electrical and pneumatic circuitry, the basic elements of a simplified electrical circuit being shown schematically in the wiring diagram of FIG. 16. Included in this diagram are some control elements which also are indicated in FIG. 1, namely, a main switch 178 for turning on the machine, a similar switch 179 in the circuits of the cam motor 177 for preparing it for operation, a pushbutton actuator 180 or effecting cutting stroke of the head 70, used for trimming during the initial set up with a new tape pancake 12, an actuator 181 for selecting either fully manual or semi-automatic operation, a "start" switch 182 for starting the winding motor under manual control, a "stop" switch 183, and a switch 184 for initiating the automatic loading sequence. The actuators of these switches are shown in FIG. 1, and the switches themselves are diagrammatically shown in FIG. 16, except for actuators 180 and 181, which are valve actuators in the pneumatic circuit.

Figure 15:
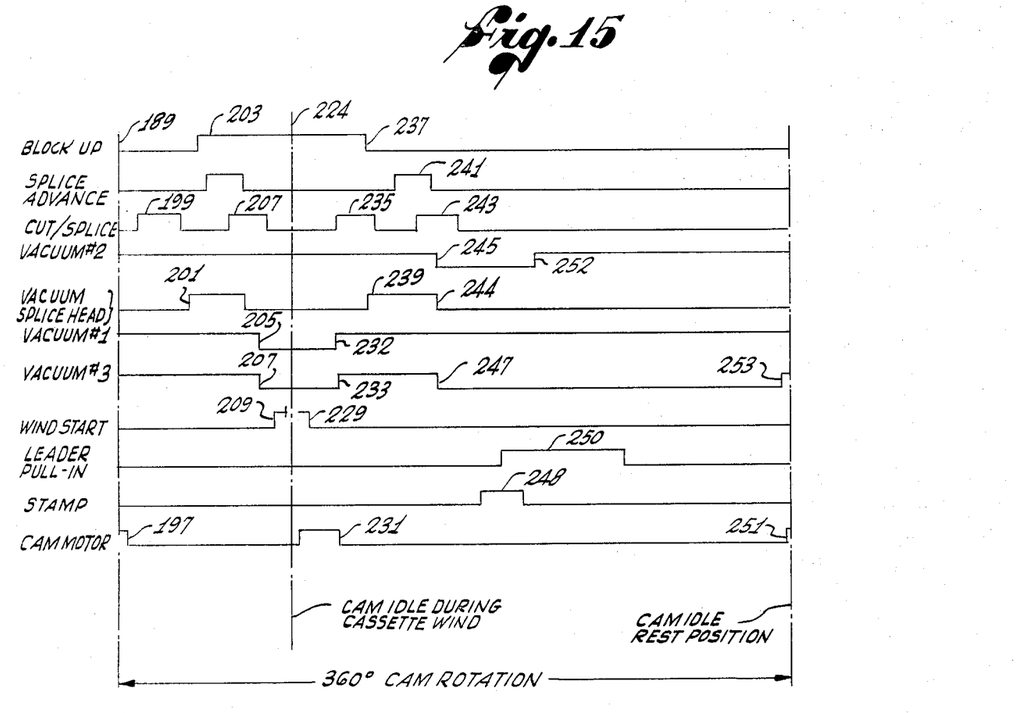
FIG. 15 is a time chart illustrating the sequence of machine operations.

Although the features and operation of the tape loader will be apparent to those skilled in the art from the foregoing description of the components of the loader, the following summary of the operation, in conjunction with the circuit diagram in FIG. 16 and the time chart in FIG. 15 showing the sequence of cam-controlled operations during the automatic cycle (360° of cam shaft rotation), should emphasize even more clearly the novel aspects of the present invention.

Initially, the machine is activated by closing the power switch 178 in a line 187 (FIG. 16) between a suitable power source 188 and the electrical control circuitry, and the pneumatic switch 181 is set for manual operation during the set-up of a tape pancake 12 on the supply platform 24. Electrical switch 179 in the circuit of the cam motor 177 is opened manually, to disable the cam shaft 157 during set-up.

When the pancake 12 is in place as shown in FIG. 1, the free end portion of the tape 11 is positioned around the idler 29, between the pinch roller 31 and the capstan 30, across the vacuum chamber device 34 and past the sensor 37, and is placed in the groove 60 of the positioning block 47, projecting at least to the notch 69 aligned with the blade 72. Since the air cylinder 62 for the block 47 is deactivated, the block is held down so that the groove 60 is aligned with the groove 51 in the block 48.

The operator then trims the end of the tape 11 by activating the head 70 manually with the valve-actuator 180 on the table 28, thus admitting air to the air cylinder 71 to advance the head 70. This cylinder preferably of the double-acting type which positively retracts the head after completion of its forward stroke. To maintain the blockout cam 93 in proper condition for the beginning of the automatic cycle, the operator causes a second, idle stroke of the head to return the cam to its vertical position after the trimming stroke.

Assuming that a roll 110 of splicing material has been placed in the splice feeder 73 with its free end portion threaded through the guide groove 112 and past the feed roller 115 to the gap 141, ready for feeding upon rotation of the feed roller, the machine is ready for regular operation as soon as the oeprator switches the pneumatic actuator 181 to automatic, and closes the cam motor switch 179. It should be noted that, at this stage, the cam assembly 144 is in the condition shown in FIG. 14, the start point indicated at 189 on the left margin of the time chart in FIG. 15. Cam 150, which controls the vacuum to the holes 59 in the tape-holding groove 60, has a long lobe 190 cooperating with the actuator 170 to apply vacuum to these holes, thus holding the trimmed tape end in place, and cam 148 has a similar long lobe 191 cooperating with the actuator 168 to apply vacuum to the holes 53 and 57 in the loop-receiving grooves 54 and 58. Cam 151 has a short lobe 192 cooperating with the actuator 171 to apply vacuum to the holes 50 in the groove 51 in the block 48, which is aligned with the central groove 60 in the block 47 when this block is in the lowered position in FIG. 10.

The operator removes a cassette 10 from a conveniently accessible stock, pulls out the leader loop 20, and places the cassette in the fixture 23 while laying the loop over the positioning blocks 47 and 48 in the manner shown in FIGS. 2 and 10. The loop, of course, is held securely in this condition by suction, and the reel 13 of the cassette is engaged with the spindle 42 to be driven by the winding motor 43. Then the operator closes the "operate" switch 184, and holds it closed for a moment, after which the machine completes the rest of the loading operation, leaving the operator free to attend to other machines.

Upon closing of the "operate" switch 184, a circuit is completed through a line 193 and the now-closed cam switch 179 to the cam motor 177, which begins to turn the cam shaft 157 at a selected speed, clockwise as viewed in FIG. 14. The first cam action in the sequence is the movement of a lobe 194 on cam 155 past its follower 158, releasing switch 175 to forward in a line 195 around the "operate" switch, which thus can be released by the operator without deenergizing the cam motor. This is indicated at 197 in the time chart.

The next cam action is the engagement of a lobe 198 on cam 147 with its follower, to activate the actuator 167 which controls the cut/splice air cylinder 71 to produce a forward and return cycle each time the follower is engaged by a lobe. Thus, the head 70 is moved into and out of engagement with the positioning blocks 47 and 48, the block-out cam 93 being positioned during the orward stroke to permit the blade 72 to be extended, thus cutting the leader loop 20 between the blocks. This head cycle is indicated in the time chart at 199.

Next, a lobe 200 on cam 149 engages its follower 158, as indicated at 201 on the time chart, and this applies vacuum to the conduits 133 in the head 70, preparatory to receiving a piece of splicing material. At about the same time, a lobe 202 on cam 145 engages its follower, which controls the delivery of air to the block-up cylinder 62, raising the block 47 as indicated at 203 on the chart. This raises the tape 11 into alignment with the leader strip 21 connected to the reel 13, as shown in FIG. 11.

As this is taking place, a lobe 204 on cam 146 engages its follower and the actuator 166 of this cam produces a pull and return cycle of the splice/feed cylinder 132, which may be a one-way cylinder with spring return (not shown). Accordingly, a length of splicing material $114^a$ is advanced through the guide groove 112 and extended through the gap 141 to project in front of the head 70, in alignment with the vacuum holes therein. Since vacuum has been applied under the control of the lobe 200 on cam 149, the splice material will be drawn against and held on the front face of the head 70.

With the head 70 thus prepared for a splicing stroke (the block-out cam 93 having been turned to the blocking position during the previous return stroke), a second lobe 205 of cam 147 engages the follower of the actuator 167 for the cut/splice cylinder 71, which shifts the head forward and back through a second, splicing cycle; indicated at 207 on the chart. As the head presses the splicing material against the aligned end portions of the tape 11 and the leader strip 21, the cam 149 terminates the application of vacuum to the head conduits, thus releasing the splicing strip in the position shown in FIG. 11 in which it joins the tape to the leader strip.

At this point, cams 150 and 151 terminate the suction in holes 59 and 50 in the aligned grooves 60 and 51, as indicated at 205 and 207 on the chart, to release the tape and the leader strip 21 for winding. Then a lobe 208 on cam 152 engages its follower, and this closes electrical switch 172 (FIGS. 14 and 16) to initiate winding of the tape into the cassette, as indicated at 209 on the chart.

As will be seen in FIG. 16, switch 172 is in the circuit of a solenoid K3, which circuit includes a line 210 from the power source, a switch K1-2, a line 211, and bypass lines 212 and 213 connected by switch 172 around the normally open "start" switch 182. When solenoid K3 is energized, it closes a plurality of switches K3-1, K3-2 and K3-3, all of which are tied together for operation in unison by solenoid K3, in a manner well known to those skilled in the art. Closing of switch K3-2 prepares a holding circuit across lines 212 and 213 around the cam switch 172, while switch K3-3 closes in a line 214 to the wind motor 43, and switch K3-1 completes an energizing circuit for another solenoid, K2, in a line 215, through normally closed "stop" switch 183.

When solenoid K2 is energized, it closes its connected switches K2-1, K2-2, K2-3, K2-4, switch K2-1 completing a holding circuit across lines 212 and 213, while switch K2-2 completes an energizing circuit through a line 217 for an actuator 218 controlling a brake (not shown) of the supply motor 25, releasing the brake preparatory to the beginning of the winding operation. Switch K2-2 also completes a circuit through line 217 and a line 219 to the solenoid 32 for the pinch roller 31, thus engaging the pinch roller with the capstan 30. At the same time, switch K2-3 is closed in a line 220 connected to a solenoid K1, preparing this solenoid for energization by a signal from the sensor 37 when the desired amount of tape has been wound into the cassette, and switch K2-4 is closed in the line 214 including now closed switch K3-3 and a normally closed switch K4-2.

This completes an energizing circuit through line 214 for the winding motor 43, which thus begins to wind tape into the cassette. Switch K2-4 also completes circuits through lines 221 and 222 for the capstan motor 33 and the supply motor 25, both of which are started with the winding motor 43. Accordingly, these motors all are started together to perform the winding operation. Although a number of switching operations take place between the closing of switch 172 by cam 152 and the starting of the motors, it should be understood that the time delay is negligible. Selection of motors that are suitable for the various rotary drives is well within the skill of the art.

Shortly after cam 152 closes switch 172 to start the winding operation, a second lobe 223 on cam 155 engages the follower for switch 175 in line 195 of the cam motor circuit, stopping the cam shaft 157 during the winding operation, as indicated by line 224 in the chart. This operation is of variable length, depending upon the footage being wound into the cassettes, and is terminated only in response to a signal from the sensor 37, which for the purpose of this disclosure, may be considered as a footage counter which introduces an electrical pulse into a line 225 when a selected footage has passed the counter.

In response to such a pulse, solenoid K1 is energized to close its switch K1-1 in a line 226 leading to a twenty-four volt power supply 227, and also to change its switch K1-2 from the full-line position shown in FIG. 16 to its alternate position at a contact 228. This opens the circuits to solenoids K2 and K3, opening all of the switches controlled by these solenoids to stop the motors and apply the brake to the supply motor 25. Thus, winding is terminated, as indicated at 229 on the chart.

At the same time, the new position of switch K1-2 completes an energizing circuit through a line 230 for a solenoid K4, which closes its switch K4-1 in the circuit of the cam motor 177 while opening its switch K4-2 in the circuit of the wind motor 43. As a result, the cam motor is started, resuming the turning of the cam shaft 157 until the lobe 223 of cam 155 passes the follower of switch 175, as indicated at 231 on the chart, permitting this switch to close again in the line 195 around switch K4-1.

Solenoid K4 remains energized for a short period of time sufficient to insure that the cam-controlled switch 175 has closed. This may be accomplished by maintaining the energization of solenoid K1 by means of the 24 volt power source 227. This power source bleeds slowly after switch K2-3 opens, and then deenergizes solenoid K1 to return switch K1-2 to the position shown. This deenergizes solenoid K-4, returning all of the electrical components to the original condition, except for cam-controlled switch 175 and the cam motor 177, which remains energized and running until the automatic sequence is completed.

Figures 12, 13:
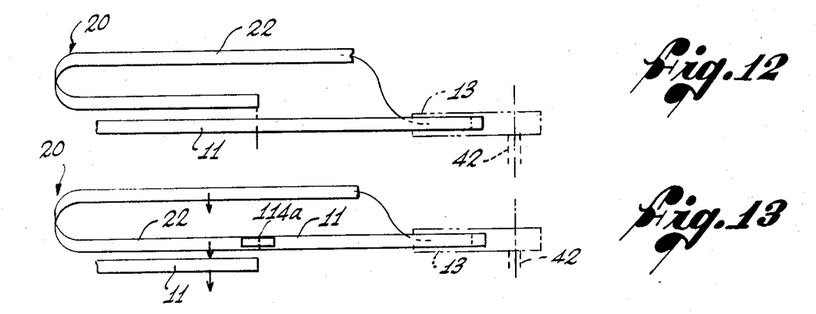
FIG. 12 is a view similar to FIG. 11 illustrating the condition of the tape during and after winding.
FIG. 13 is a view similar to FIG. 12 illustrating the return of the second leader strip to the initial condition and the splicing thereof to the trailing end of the magnetic tape.

The cams 150 and 151 again apply suction to the holes 59 and 50 in the aligned grooves 60 and 51, as indicated at 232 and 233 in the chart, to grip the magnetic tape 11 in both positioning blocks 47 and 48. As soon as this has been done, a third lobe 234 of cam 147 produces a cutting cycle of the head 70, indicated at 235 in the chart, to sever the magnetic tape, as shown in FIG. 12. During the return stroke, the ratchet mechanism 74 conditions the head for the nect splicing stroke.

After the tape 11 has been severed, the lobe 202 of cam 145 passes the follower of the actuator 165 for the block-up cylinder 62, its return spring 65 to lower the block 47 to its original position. This displaces the end portion of the tape coming from the pancake 12 downwardly from the tail end of the tape connected to the cassette, and simultaneously lowers the end of the leader strip 22 into alignment with the ail end, all as shown in FIG. 13 and as indicated at 237 on the chart. Thus, the tape and the leader strip are prepared for the final splice.

As the return stroke of the head 70 is completed after the cutting stroke, a second lobe 238 on cam 149 applies vacuum to the conduits in the head (as indicated at 239 on the chart), and a second lobe 240 on cam 146 actuates the splice feeder 73 (as indicated at 241 on the chart) to advance a strip of splicing material into the path of the head. As this is completed, a fourth lobe 242 on cam 147 actuates the cut/splice cylinder 71 for the splicing stroke (as indicated at 243 on the chart) during which the head is extended, severs the splicing strip 114$^a$, and applies the strip across the aligned ends of the tape and the leader strip. The vacuum holding the splice material on the head is released by the lobe 238 of cam 149, as indicated at 244 on the chart, to leave the strip in place, and the head is retracted. During the return stroke, of course, the head is conditioned for the next cutting stroke.

The splice being complete, cams 148 and 151 terminate the suction to the holes 53 and 57 in the grooves 54 and 58 holding the leader strip 22, as indicated at 245 on the chart, and also to the holes 50 in the groove 51 holding the tail-end portion of the tape wound onto the reel 13 of the cassette 10, as indicated at 247 on the chart. At this point, the cam 154 may actuate the cylinder 143 to stamp identification data on the cassette, as indicated at 248 on the chart, after which a lobe 249 on cam 153 closes its switch 173. This switch is in a line 249 (see FIG. 16) providing an alternate energizing circuit for the winding motor 43, which thus runs momentarily to turn the reel 13 long enough to take up the tail-end portion of the tape and the leader strip 22. This pullin operation, indicated at 250 on the chart is timed by the length of the lobe 249 on cam 153, the motor being stopped by opening of the switch 173 after the lobe passes its follower 158.

When this occurs, the loading operation is complete and the cassette 10 that has been loaded may be removed, for insertion of an empty cassette in its place, in the manner described with respect to the first cassette. The cam shaft 157 continues to turn until the lobe 194 of cam 155 opens switch 175 in the circuit of the cam motor, as indicated at 251 on the chart. Vacuum is restored to the holes 53 and 57 of the grooves 54 and 58 after the leader strip 22 has been pulled away from the movable block, as indicated at 252 on the chart, and also is restored to the holes 50 in the groove 51 before the end of the cycle, so as to be ready to receive and hold the loop 20 of the next cassette, as indicated at 253 in the chart.

For each succeeding cassette, the procedure is the same. It has been found that the time required for a reasonably skillful operator to remove one cassette, place another in the machine, and initiate the automatic loading sequences is on the order of 4 to 6 seconds. Accordingly, the operator can service several machines, the exact number varying with the footage being loaded, with substantially greater production capacity than has been practical heretofore. Of course, there is a delay in the output of each machine at the beginning of each new pancake, but these delays are of relatively short duration.

From the foregoing, it should be evident that the present invention provides a semi-automatic cassette loader that effectively performs the full loading operation at high speed after an operator has inserted a cassette in the fixture and placed the leader loop on the holding means. Moreover, the operator time required to insert the cassette and place the loop is very short, and the construction of the machine is relatively simple and inexpensive, as compared to competitive machines of the same general type.

It also will be evident that, while a specific embodiment has been illustrated and described, various modifications and changes may be made without departing from the spirit and scope of the invention.

I claim:

1. In a machine for loading a tape cassette having a leader attached to two reels of the cassette and adapted to be drawn out as a loop, said machine having means for holding a supply roll of tape in a supply station, means for holding a cassette to be loaded in a loading station, and means for feeding tape along a predetermined path from said supply station to said loading station through an intermediate splicing station, including means for driving one reel of the cassette in the loading station, an improved cutting-and-splicing apparatus comprising:

two positioning members mounted in side-by-side relation in said splicing station on one side of said path on opposite sides of a transverse plane through said path, and relatively movable along said plane between first and second displaced operating conditions, said first member being on the side of said plane closest to said supply station;

first and second holding grooves formed in said first and second member, respectively, in the sides thereof adjacent said path, and aligned with said path in said first opeating condition to receive one side portion of the loop from the cassette, said holding grooves being displaced from eith other, parallel to said path, in said second operating condition;

blade mounting means on the front side of said head adjacent said path and movable relative to said head between blade-extending and blade-retracting positions, for supporting a blade for movement along said plane;

means operable as an incident to the reciprocation of said head to convert the head alternately to a cutting head in which the blade is extended at the end of a forward stroke, and to a splicing head in which the blade is held retracted at the end of a forward stroke, thereby producing alternating cutting strokes and intervening splicing strokes;

means for supplying strips of splicing material to the front side of said head during said splicing strokes, in alignment with said path across said plane, for application of the splicing material across said plane to the tape and leader lying on said path;

and control means for operating said machine to cut the leader in said first and second grooves along said plane, align the tape from the supply roll with said second groove, apply a strip of splicing material to join the leader and the tape across said plane, wind a selected length of tape into the cassette along said third and second grooves, sever the tape across said plane, align said first and third grooves along said path, apply a second strip of splicing material across said plane, and wind the remaining tape and leader material into the cassette.

2. A machine as defined in claim 1 in which said blade mounting means comprise an outer body having a front side with a slot therein and reciprocable into and out of engagement with said members with said slot along said plane, an inner body movable toward and away from said front side within said outer body and yieldably urged rearwardly therein, and a blade chuck on the front side of said inner body for holding a blade in alignment with said slot for extension and retraction therein.

3. A machine as defined in claim 2 in which said means for converting said head comprise a blocking member carried by said outer body an movable between blocking and unblocking positions relative to said inner body, and means for shifting said blocking member alternately between blocking and unblocking positions for successive forward strokes of said head.

4. A machine as defined in claim 3 in which the last-mentioned means comprise a ratchet mechanism having a ratchet wheel carried by said outer body and coupled to said blocking member to turn the same from one position to the next for each forward stroke, and a pawl mounted in a stationary position along the path of said head for engagement with said wheel.

5. A machine as defined in claim 1 in which said positioning members are formed with a notch along said plane for receiving the blade during the cutting strokes.

6. A machine as defined in claim 1 in which said means for receiving the second side portion of the leader loop is a fourth holding groove formed in said first member, on the side of said first groove opposite said third groove.

7. A machine as defined in claim 6 in which said fourth groove is formed on a portion of said first member that is inclined outwardly and away from said path, said fourth groove also being inclined away from said path from said plane toward the supply station to spread the side portions at said splicing station.

8. A machine as defined in claim 6 in which each of said grooves has vacuum holes therein, and further including means for applying vacuum to said holes to grip tape and leader therein while the latter are stationary.

9. A machine as defined in claim 1 in which said splice-supplying means include means for supporting a roll of splicing material and feeding out a selected increment of the material for each splicing stroke, means guiding the material into the path of said head, a cutter on said head for severing the increment as the head is moved forward during a splicing stroke, and means for gripping the splicing material on the head and releasing it on the tape and leader.

10. A machine as defined in claim 9 in which the last-mentioned means comprise a row of vacuum holes across the front of said head in alignment with said path.

11. In a machine for loading a tape cassette having two reels for holding a length of tape and winding the tape alternately from one reel to the other, and a leader connected at its ends to said reels and adapted to be drawn out as a loop and severed between its ends to from first and second leader strips connected to said reels and to be joined to the opposite ends of a length of tape to connect the latter to said reels; said machine having means in a supply station for holding a roll of tape to be loaded on cassettes, means for holding a cassette in a loading station, means for feeding tape from said supply station along a preselected path through a splicing station to the loading station, and selectively operable means at said loading station for driving the reel of a cassette connected to said first leader strip to wind the leader and the tape on the reel, the combination of:

a tape-and-leader positioning device at said splicing station, having a first holding member disposed on one side of said path and having one side facing toward said path and first means for holding said first leader strip in a preselected position on said one side, a second holding member disposed on said one side of said path beside said first holding member, between the latter and said supply station, and also having one side facing toward said path and second means for holding said second leader strip in a preselected position, said second holding member also having third means on said one side thereof for holding the free end portion of the tape from the supply roll, said third holding means being spaced transversely of said path from said second holding means, and means for shifting said first and second holding members back and forth relative to each other, transversely of said path, between a first condition in which said first and second holding means are aligned to receive and hold one side portion of the leader loop prior to severance, and a second position which whch said first and third holding means are aligned for splicing of said free end portion to said first leader strip after severance;

a cutting-and-splicing mechanism at said splicing station, having a head disposed on the opposite side of said path from said holding members and mounted for movement through forward and return strokes, toward and away from said holding members, means for mounting a blade on said head for movement therewith, and also for movement relative thereto between an extended position projecting from the head toward said path for cutting engagement with said leader strip between said members, and a retracted position within said head, means for positioning the blade alternately in said extended position and said retracted position during successive forward strokes of said head, thereby alternately activating and deactivating the blade to produce alternating cutting strokes and intervening splicing strokes of said head, and means for supplying a strip of splicing material to said head for application during each splicing stroke;

and control means for operating said tape-and-leader positioning device, said cutting-and-splicing mechanism, said tape-feeding means, said splicing-material supplying means, and said selectively operable means at said loading station after a leader loop has been placed on said holding means with said holding members in said first condition, to move said head through a cutting stroke and a return stroke, thereby severing the leader, shift said holding members to said second condition to separate the leader strips while aligning the tape with said first strip, move said head through a splicing stroke and a return stroke to apply a strip of splicing material to join the tape to said first leader strip, drive the reel and said feed means to wind a preselected length of the tape on the reel, stop the reel and the feed means, repeat the severing stroke and the return stroke of said head, return said holding members to said first condition, and repeat the splicing and return strokes of the head, thereby splicing the severed end of said length of tape to said second leader strip.

12. In a machine for loading a tape cassette having a leader attached to two reels in the cassette and adapted to be drawn out as a loop, said machine having means for holding a supply roll of tape in a supply station, means for holding a cassette to be loaded in a loading station, and means for feeding tape along a predetermined path from said supply station to said loading station through an intermediate splicing station, the combination of:

drive means at said loading station for rotating one reel of the cassette to wind tape theron;

positioning means at said splicing station on one side of said path for receiving the loop from the cassette and holding the loop initially with the two side portions thereof separated transversely of said path for severance of one of said side portions, said positioning means also having means for initially holding the end portion of the tape from the supply roll spaced transversely of said path from said one side portion and being movable from the initial condition to a second condition in which the severed parts of said one side portion are displaced from each other and said end portion is in aligned end-to-end relation with the severed part connected to said one reel;

splicing means at said splicing station on the side of said path opposite said positioning means and including a head movable repetitively into and out of engagement with said positioning means, in the area thereof holding said one side portion in said initial condition, and means converting said head alternately from a cutting device to a splicing device and back during successive engagements;

and control means for said machine including means for moving said head through a cycle of four engagements with the positioning means, two before winding and two after winding, beginning with a cutting engagement; actuating means for holding said positioning means in said initial condition during the first engagement for severing of the loop, and shifting the positioning means to said second condition for the second engagement, for splicing of the tape to the severed part connected to said one reel; and means for activating said drive means to wind a selected length of tape into the cassette; said actuating means holding the positioning means in the second condition during the third engagement for severing of the tape, and returning the positioning means to said initial condition for the fourth engagement, for splicing of the tape from the cassette to the remaining portion of said leader loop.

13. The combination defined in claim 12 in which said positioning means comprise first and second holding members disposed on one side of said path and having vacuum activated holding areas for receiving and holding the loop with the two side portions thereof separated transversely of said path, and movable relative to each other by said actuating means to displace the severed portion of the tape, said control means also including means for selectively applying and relieving vacuum to said holding areas to grip and release the parts of the tape during different parts of said cycle.

14. The combination defined in claim 12 in which said control means also include means for activating said drive means momentarily after splicing of the tape from the cassette to the remaining portion of the leader loop, thereby to pull in the spliced loop at the end of the cycle.

15. The combination defined in claim 12 further including means activated by said control means during each cycle to apply identifying data to each cassette.

16. The combination defined in claim 12 in which said head is moved into and out of positive clamping engagement with said positioning means, to trap and hold the material during severance.

17. The combination defined in claim 16 in which said means converting said head alternatively from a cutting device and a splicing device include blade-mounting means on the side of said head adjacent said path and movable relative to the head between blade-extending and blade-retracting positions, and means for producing movement of said blade-mounting means to said blade-extending position during the cutting strokes, and preventing such movement during the splicing strokes.

18. The combination defined in claim 17 in which said positioning means comprise two relatively movable, side-by-side positioning members disposed on opposite sides of a cutting plane extending transversely of said path, said blade-holding means being arranged to reciprocate a blade along said plane, and said positioning members defining a notch adjacent said path for entry of the blade through the tape.

19. In a machine fo loading a tape cassette having a leader attached to two reels in the cassette and adapted to be drawn out as a loop, said machine having means for holding a supply roll of tape in a supply station, means for holding a cassette to be loaded in a loading station, and means for feeding tape along a predetermined path from said supply station through an intermediate loading station, including means for rotating one reel of the cassette in the loading station after the leader has been spliced to the tape, and means at said splicing station for severing the tape and the leader in a selected transverse plane through said path, and for applying splices across said plane; an improved positioning device comprising:

first and second positioning members disposed in side-by-side relation in said splicing station on one side of said path, on longitudinally opposite sides of said first member on the side of said plane closest to said supply station, one of said members being movable relative to the other, parallel to said plane, between first and second displaced positions;

first and second holding means on said first and second members, respectively, that are aligned longitudinally of said path when said one member is in said first condition, to receive and hold one side portion of the leader loop from the cassette;

third holding means on said first member spaced laterally from said first holding means for alignment with said second holding means when said one member is in said second position, to receive and hold the end portion of the tape from the supply station;

and fourth holding means on said first member, on the side of said first holding means opposite said third holding means, to receive and hold the other side portion of the leader loop in spaced relation with said one side portion thereof.

20. A machine as defined in claim 19 in which said holding means are grooves in the sides of said members adjacent said path, having rows of vacuum-applying openings for holding the tape and the leader in said grooves.

21. A machine as defined in claim 20 in which said first member has one side facing toward said path, and an inclined extension of said one side on the side of said path opposite said third holding means, the groove of said fourth holding means being inclined along said inclined extension from said plane away from said path, to separate said side portions toward the closed end of said loop.

22. A machine as defined in claim 19 in which said members are blocks in sliding engagement at said plane, and defining a notch at said plane on the side adjacent said path, to receive a cutting tool.

23. In a machine for loading a tape cassette having a leader attached to two reels in the cassette and adapted to be drawn out in a loop, said machine having a base, means for holding a supply roll of tape in a supply station, means for holding a cassette to be loaded in a loading station, means for feeding tape along a predetermined path from said supply station to said loading station through an intermediate splicing station, and positioning means at said splicing station for receiving the leader loop for severance, aligning one severed end with the end of the tape from the supply station for splicing and winding, and aligning the end of the tape on the cassette with the other severed end after winding and severing, an improved cutting-and-splicing mechanism comprising:

a head supported at said splicing station for reciprocation through forward and return strokes, toward and away from said path, from the side thereof opposite said positioning means, into and out of engagement with the latter;

means for mounting a blade on said head on the side of said head adjacent said path, for reciprocation with the head and also for movement relative to the head between extended and retracted positions;

means operable as an incident to the reciprocation of said head to move said blade mounting means forwardly to extend the blade for cutting engagement at the end of alternate forward strokes, and to move the blade mounting means rearwardly to retract the blade during the intervening forward strokes, thereby activating said head as a cutting mechanism during said alternate forward strokes;

and means operable during said intervening strokes to apply splicing material to the side of said head adjacent said path, in alignment therewtih, for application to the tape and the leader.

24. A machine as defined in claim 23 in which said blade mounting means is carried on said head on a support that is movable relative to the head to extend and retract the blade, said member being yieldably urged in a direction to retract the blade, and in which said means for extending and retracting the blade further include a block-out member movable between blocking and unblocking positions for successive forward strokes and operable in said blocking position to prevent extension of said blade upon engagement of said head with said positioning means.

25. A machine as defined in claim 24 in which said extending and retracting means also include a ratchet mechanism acting between said head and said base to change said block-out member alternately to said unblocking position for each of said alternate forward strokes, and to said blocking position for each of said intervening strokes.

26. A machine as defined in claim 23 in which said means for applying splicing material include means for supporting a supply roll of such material, means for feeding a selected length of material from said supply roll into the path of said head for each of said intervening strokes, a cutter on said head for severing the material, and means on said head for holding the severed material on the head for application of the material to the tape and the leader on said positioning means.

27. A machine as defined in claim 26 in which said cutter forms one side edge of the side of said head adjacent said path, and further including a backing member positioned along the path of said head during its forward strokes, for sliding engagement with said cutter, said feeding means being positioned to feed said length of material into the path of said head between said cutter and said backing member.

28. A machine as defined in claim 27 in which said means for holding the severed material comprise a row of holes in the side of said head adjacent said path, aligned with the length of splicing material fed from the supply roll, and means for applying vacuum to said holes during said intervening forward strokes to grip the splicing material, and relieving the vacuum at the ends of said intervening strokes to release the splicing material.

29. In a machine for loading strip material into a holder for such material, and including means for holding a supply roll of strip material in a supply station, means for supporting a holder in a loading station, means for feeding strip material along a predetermined path to said loading station through a cutting-and-splicing station, and positioning means at said cutting-and-splicing station for positioning strip material for cutting and splicing, an improved cutting-and-splicing mechanism comprising:

a head supported at said cutting-and-splicing station for reciprocation through forward and return strokes, toward and away from said positioning means and into and out of engagement therewith;

means for mounting a blade on said head, on the side thereof engageable with said positioning means, for reciprocation with the head and also for movement relative to the head between extended and retracted positions;

means operable during successive forward-and-return-stroke cycles to extend said blade-mounting means toward said positioning means for alternate forward strokes, and to retract the blade mounting means into said head for intervening forward strokes, thereby activating said head as a cutting mechanism during said alternate forward strokes;

and means for applying splicing material to the side of said head adjacent said positioning means to be carried toward the positioning means for application to the strip material during said intervening forward strokes, thereby activating said head as a splicing mechanism during said intervening forward strokes.

* * * * *

PO-1050
(5/69)

UNITED STATES PATENT OFFICE
CERTIFICATE OF CORRECTION

Patent No. 3,848,825   Dated November 19, 1974

Inventor(s) Zielke, Darrell W.

It is certified that error appears in the above-identified patent and that said Letters Patent are hereby corrected as shown below:

Col. 1, line 60, delete "tape"

Col. 3, line 6, change "takn substnatially" to --taken substantially--

Col. 3, lines 13-30, delete in their entirety;

Col. 4, line 47, change "32" to --30--

Col. 9, line 36, change "troke" to --stroke--

Col. 11, line 10, change "lidably" to --slidably-- line 64, change "assette" to --cassette--

Col. 12, line 36, change "or" to --for--;

after "effecting" insert --a--

Col. 13, line 23, change "oeprator" to --operator-- line 59, change "forward" to --close--

Col. 14, line 4, change "orward" to --forward--

Col. 16, line 13, change "nect" to --next--;

line 17, before "its" insert --permitting-- line 22, change "ail" to --tail--

Col. 17, line 56, change "opeating" to --operating-- line 58, change "eith" to --each--

PO-1050
(5/69)

UNITED STATES PATENT OFFICE
CERTIFICATE OF CORRECTION

Page 2

Patent No. 3,848,825     Dated November 19, 1974

Inventor(s) Zielke, Darrell W.

It is certified that error appears in the above-identified patent and that said Letters Patent are hereby corrected as shown below:

Col. 17 corrections (cont'd)

Col. 17, line 61, please insert the following elements:

--a third holding groove formed in said first member parallel to said first groove and offset from said path in said first condition and aligned with said path in said second condition, for holding the tape from the supply roll and moving the same into alignment with said second groove;
    means for receiving the second side portion of said loop as said first side portion is placed in said first and second grooves, and holding the second side portion in spaced relation with the first side portion;
    a cutting-and-splicing head supported at said splicing station for reciprocation through forward and return strokes, toward and away from said path from the side thereof opposite said positioning means, into and out of engagement with the latter at said plane;--

Col. 19, line 19, change "from" to --form-- line 55, before "which" insert --in--;
    delete "whch"

Col. 23, line 18, change "therewtih" to --therewith--.
    Signed and sealed this 1st day of April 1975.

(SEAL)
Attest:

RUTH C. MASON
Attesting Officer

C. MARSHALL DANN
Commissioner of Patents
and Trademarks